Patented Mar. 4, 1941

2,233,402

UNITED STATES PATENT OFFICE 2,233,402

PROCESS OF STIFFENING REGENERATED CELLULOSE

Arthur Cresswell, Elizabethton, Tenn., assignor to North American Rayon Corporation, New York, N. Y., a corporation of Delaware No Drawing. Application January 20, 1939, Serial No. 251,917

12 Claims. (Cl. 8—124)

The present invention relates to a process of stiffening regenerated cellulose in the form of filaments, threads, cords, films, etc., and more specifically to a process of crushproofing velvet pile of such cellulose.

One object of this invention is to provide a process of stiffening regenerated cellulose by treating it with formaldehyde in the presence of water and a catalyst, said catalyst including an alpha-substituted fatty acid having an ionization constant from about $7 \times 10^{-4}$ to $3.2 \times 10^{-3}$ at a temperature of about 25° C.

A further object of this invention is the crushproofing of velvet pile of regenerated cellulose with formaldehyde and acid catalysts of the aforementioned type.

Other objects of this invention will become apparent to those skilled in the art from a study of the following specification.

I am well aware that it has, heretofore, been proposed to impart stiffness to products of regenerated cellulose by treating them with formaldehyde containing an acid or alkaline catalyst (vide, for example, French Patent #374,724 to Eschalier and its additions Nos. 8,122, 9,904, 9,905 and 10,760; U. S. Patent #1,234,720 to Bloch-Pimentel; U. S. Patent #1,591,922 to Karplus; U. S. Patent #2,118,685 to Stadler; etc.). Furthermore, I am also aware that U. S. Patent #2,080,043 to Heckert of May 11, 1937, discloses the production of crush-resistant velvet by treating a velvet pile of regenerated cellulose with formaldehyde in the presence of water and an acid, etc. However, in actual practice it has consistently been found that the catalysts known in the art cause a degradation of regenerated cellulose, this degradation resulting in an embrittlement of the stiffened products. By experimentation, I have unexpectedly found that the aforementioned embrittlement of regenerated cellulose may be overcome by using an alphahalogenated fatty acid having an ionization constant between $7 \times 10^{-4}$ and $3.2 \times 10^{-3}$ in water of about 25° C. Examples of such acids are alphachlorinated, alpha-brominated, alpha-iodinated, fatty acids, etc., of the type set forth above. Specific examples of suitable catalysts are alphachloracetic acid, alpha-bromacetic acid, alphaiodoacetic acid, alpha-chlorpropionic acid, alphabromo-n-butyric acid, etc.

Processes of stiffening regenerated cellulose are conventionally carried out by treating the cellulose with a solution containing formaldehyde and the acid catalyst. The treated cellulose is dried and heated to a temperature of about 275° F. to cause condensation between the cellulose and the formaldehyde with the aid of the catalyst. The condensation itself presumably results in the formation of methylene ethers of cellulose and thereby causing "bridging" between adjacent hydroxyl groups of the cellulose. Effective catalysts in this process must have three properties, namely:

1. The catalyst must be strong enough to bring about condensation between cellulose and formaldehyde.
2. The catalyst must not be too strong to cause degradation of the cellulose during condensation.
3. The acid must not be too volatile in order to remain in the cellulose during the condensation.

In contradistinction to catalysts disclosed in the prior art, alpha-halogenated fatty acids having an ionization constant between $7 \times 10^{-4}$ and $3.2 \times 10^{-3}$ at a temperature of about 25° C. possess the three aforementioned properties. Thus, they are very efficient catalysts (condensation agents) in processes of stiffening regenerated celluloses. The following table clearly depicts the improved results obtained with the novel catalysts in comparison with ammonium chloride, a catalyst heretofore conventionally used in the art.

Table

Results obtained by using a 12% formaldehyde solution containing 0.5% by weight of the catalyst.

| Catalyst | Loss of loop strength per 100 den. | Elongation | |
|---|---|---|---|
| | | Dry | Wet |
| | Percent | | |
| Ammonium chloride | 57.7 | 4.8 | 4.2 |
| Alpha-chloracetic acid | 8.3 | 12.5 | 13.0 |
| Alpha-iodoacetic acid | 6.8 | 13.0 | 14.0 |
| Alpha-bromacetic acid | 25.3 | 11.0 | 10.0 |
| Alpha-chlorpropionic acid | 12.8 | 12.0 | 11.0 |
| Alpha-bromo-n-butyric acid | 14.9 | 10.0 | 12.0 |

For the determination of the loop strength, the yarn is formed into two interlocking loops and the yarn thereupon fixed in a tensile strength testing machine in such a way that the interlocking loops are midway between the thread-clamping jaws. By subjecting the thread to a stress, the break takes place at the loop at which point the thread is bent at an angle of 180°. The more embrittled the yarn the lower is the stress required to cause the thread to break. The loop strength is calculated on the basis of grams per 100 deniers. The straight tensile strength of the treated, regenerated cellulose is measured in grams per 100 deniers in conventional manner with a Schopper testing machine. The loss of loop strength is subsequently calculated from the difference between the straight tensile strength and the loop strength of the treated, regenerated cellulose thread.

These results clearly indicate that ammonium chloride, conventionally used in the art as a catalyst in the stiffening of cellulose, causes embrittlement of regenerated cellulose. The novel catalysts, however, do not cause deleterious embrittlement of the yarn, this being evidenced by the small reduction in loop strength and elongation of the treated, regenerated cellulose.

*Example 1*

A thread, film, cord, etc., of regenerated cellulose, obtained for example by the viscose or cuprammonium process, etc., is soaked in an aqueous formaldehyde solution containing about 12% by weight of formaldehyde and about 0.5 to 1.0% by weight of an alpha-halogenated fatty acid, for example alpha-chloracetic acid, as a catalyst, the percentage of the catalyst being calculated on the weight of the formaldehyde solution. The regenerated cellulose is then dried, heated to a temperature of about 275° F., dried again, and finished. The cellulose is stiffened without becoming deleteriously embrittled.

*Example 2*

A velvet type fabric having a pile of regenerated cellulose and a fabric backing of natural silk or any other material resistant to the action of formaldehyde is treated in accordance with the process set forth in Example 1. The velvet pile is crush-proofed without becoming unduly embrittled. The crush-proofing solution may also contain suitable softening agents.

Although these examples will clearly illustrate the present invention, I wish to emphasize that the percentages of the various ingredients of the crush-proofing composition may be varied within wide limits, that the baking temperature may be lower or higher than 275° F. and that the formaldehyde may be replaced by any compound capable of furnishing formaldehyde at the temperature of reaction, such as trioxymethylene, etc.

Modifications of my invention will readily be recognized by those skilled in the art, and I desire to cover all modifications and variations coming within the scope of the appended claims.

I claim:

1. In the process of stiffening artificial silk, the step which comprises treating a regenerated cellulose at an elevated temperature with formaldehyde in the presence of water and a catalyst, said catalyst consisting of an alpha-halogenated fatty acid having an ionization constant of about $7 \times 10^{-4}$ to $3.2 \times 10^{-3}$ at a temperature of about 25° C.

2. In the process of stiffening artificial silk, the step which comprises treating a regenerated cellulose at an elevated temperature with formaldehyde in the presence of water and a catalyst, said catalyst consisting of an alpha-chlorinated fatty acid having an ionization constant of about $7 \times 10^{-4}$ to $3.2 \times 10^{-3}$ at a temperature of about 25° C.

3. In the process of stiffening artificial silk, the step which comprises treating a regenerated cellulose at an elevated temperature with an aqueous solution of formaldehyde and alpha-chloracetic acid.

4. In the process of crushproofing velvet pile, the step which comprises treating a velvet pile of regenerated cellulose at an elevated temperature with formaldehyde in the presence of water and a catalyst, said catalyst consisting of an alpha-halogenated fatty acid having an ionization constant of about $7 \times 10^{-4}$ to $3.2 \times 10^{-3}$ at a temperature of about 25° C.

5. In the process of crushproofing velvet pile, the step which comprises treating a velvet pile of regenerated cellulose at an elevated temperature with formaldehyde in the presence of water and a catalyst, said catalyst consisting of an alpha-chlorinated fatty acid having an ionization constant of about $7 \times 10^{-4}$ to $3.2 \times 10^{-3}$ at a temperature of about 25° C.

6. In the process of crushproofing velvet pile, the step which comprises treating a velvet pile of regenerated cellulose at an elevated temperature with an aqueous solution of formaldehyde and alpha-chloracetic acid.

7. In the process of stiffening artificial silk, the step which comprises treating a regenerated cellulose at a temperature of about 275° F. with formaldehyde in the presence of water and a catalyst, said catalyst consisting of an alpha-halogenated fatty acid having an ionization constant of about $7 \times 10^{-4}$ to $3.2 \times 10^{-3}$ at a temperature of about 25° C.

8. In the process of stiffening artificial silk, the step which comprises treating a regenerated cellulose at a temperature of about 275° F. with formaldehyde in the presence of water and a catalyst, said catalyst consisting of an alpha-chlorinated fatty acid having an ionization constant of about $7 \times 10^{-4}$ to $3.2 \times 10^{-3}$ at a temperature of about 25° C.

9. In the process of stiffening artificial silk, the step which comprises treating a regenerated cellulose at a temperature of about 275° F. with formaldehyde in the presence of water and alpha-chloracetic acid.

10. In the process of crushproofing velvet pile, the step which comprises treating a velvet pile of regenerated cellulose at a temperature of about 275° F. with formaldehyde in the presence of water and a catalyst, said catalyst consisting of an alpha-halogenated fatty acid having an ionization constant of about $7 \times 10^{-4}$ to $3.2 \times 10^{-3}$ at a temperature of about 25° C.

11. In the process of crushproofing velvet pile, the step which comprises treating a velvet pile of regenerated cellulose at a temperature of about 275° F. with formaldehyde in the presence of a catalyst, said catalyst consisting of an alpha-chlorinated fatty acid having an ionization constant of about $7 \times 10^{-4}$ to $3.2 \times 10^{-3}$ at a temperature of about 25° C.

12. In the process of crushproofing velvet pile, the step which comprises treating a velvet pile of regenerated cellulose at a temperature of about 275° F. with an aqueous solution of formaldehyde and alpha-chloracetic acid.

ARTHUR CRESSWELL.